Jan. 27, 1970     G. J. MARCO ET AL     3,492,398

AMINOPOLYAMIDE RESIN COATING FOR BIOLOGICALLY ACTIVE SUBSTANCES

Filed Aug. 27, 1965

INVENTORS
ERNEST G. JAWORSKI
GINO J. MARCO
ERHARD J. PRILL

BY Donald *Naefele*
ATTORNEY

United States Patent Office  3,492,398
Patented Jan. 27, 1970

3,492,398
AMINOPOLYAMIDE RESIN COATING FOR
BIOLOGICALLY ACTIVE SUBSTANCES
Gino J. Marco, Webster Groves, Erhard J. Prill, St.
Louis, and Ernest G. Jaworski, Olivette, Mo., assignors to Monsanto Company, St. Louis, Mo., a corporation of Delaware
Filed Aug. 27, 1965, Ser. No. 483,057
Int. Cl. A61k 17/00, 21/00, 27/00
U.S. Cl. 424—32
16 Claims

ABSTRACT OF THE DISCLOSURE

Biologically active substances sufficiently enclosed in an aminopolyamide resin containing from 1 to 4.2 weight percent of amino nitrogen, from 83 to 87.5 weight percent of hydrocarbon and 8.3 to 16 weight percent of amide

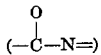

Figure 1:
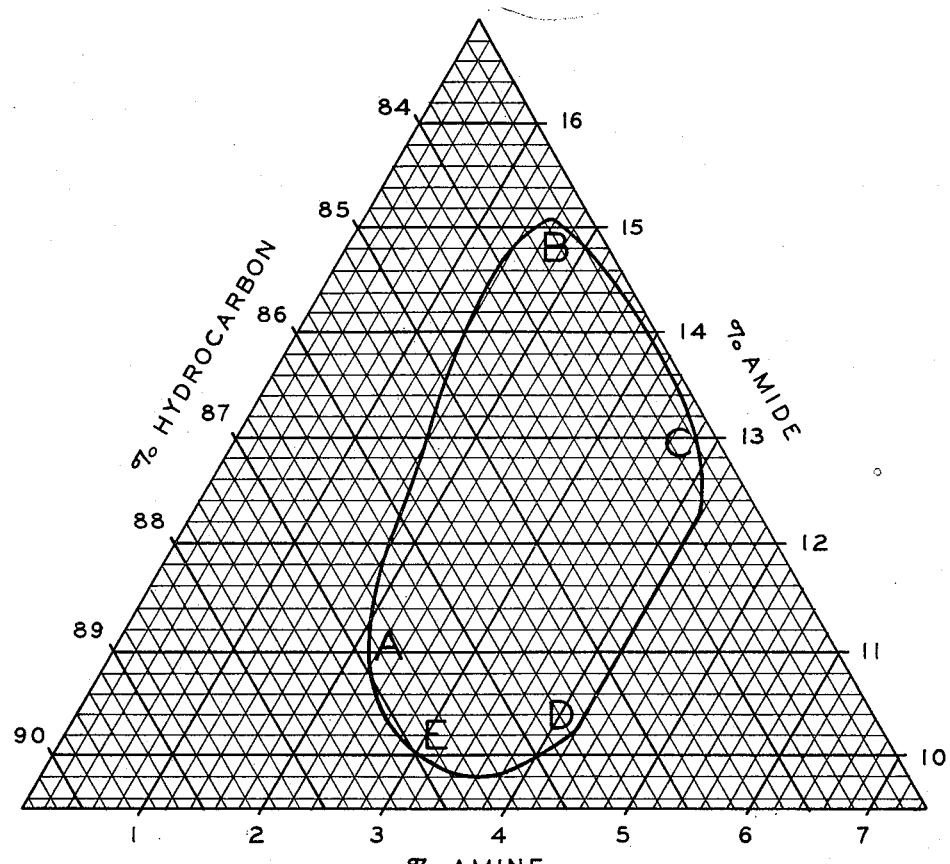

to be substantially nondispersible in the gastric and rumen fluids while being substantially dispersible in the intestinal fluids.

---

This invention relates to ruminant feeds comprising conventional feed components including components which have specific physiological effects, and are hereinafter described as "biologically active substances." More specifically, the invention consists of feeds in which the biologically active substances are provided with protective carriers or coatings.

It is well known that many of the biologically active components of animal feeds perform their intended functions when absorbed from the intestinal tract. However, before reaching the site of assimilation, orally fed compounds are subjected to the gastric fluids which may have a deleterious effect on the active component. It is also well known to coat tablets, pills or granules containing the active compounds with materials which are stable under the acid conditions found in the animal stomach.

The selection of a suitable coating composition presents serious problems, because many substances resistant to acid media are also stable under the more neutral fluids of the intestinal area. The coated compounds then will not release the active component, where is is required for maximum performance. Accordingly, a purpose of this invention is to provide coating compositions which are stable under the acid conditions of the gastric fluids yet are dispersible in the intestinal fluids.

Ruminant animals present special problems, because the rumen microflora are so abundant and multifarious that they may decompose and render useless both active components and coating compositions. Although many resinous compositions are known to be inert to the rumen fluids and stable under acidic conditions, these are also stable under the mild conditions characteristic of the intestinal tract and therefore do not release the active agent where it is required. For this reason the development of a suitable coating composition for the active component in ruminant feed has presented a complex problem. Accordingly, the primary purpose of the invention is to provide coating compositions which are stable and capable of maintaining their insolubility in the presence of both the rumen and gastric fluids and their dispersibility in intestinal fluid.

The term "biologically active substance" as used in this specification and the appended claims includes pharmaceuticals, nutrients, stimulants, hormones and other substances fed to animals or humans, for obtaining specific physiological effects. These biologically active substances are frequently components in animal feed compositions or are otherwise administered to animals or humans in the treatment of disease, infection, malnutrition and other maladies. This genus of biologically active substances includes nutrients, such as aminoacids, for example lysine, methionine, combinations of aminoacids, and analogues thereof, i.e. methionine hydroxy analogues; antibiotics, such as procaine penicillin G, bacitracin, streptomycin, erythromycin, chlorotetracycline and oxytetracycline; vitamins, such as Vitamin A and Vitamin D; sedatives, such as amytal, phenobarbital, sodium pentabarbital and cyclopentenyl barbituric acid; antipyretics, such as aspirin and sodium salicylate; hormones, such as the androgenic steroids, estrogenic steroids and hydrocortisone; anthelmintics, such as phenothiazine and piperazine derivatives; hypoglycemic agents, such as sulfonylureas and biguanides; enzymes, such as the amylases, pepsin, gumases and maltases; and other compounds known to be useful, such as antispasmodics, hematics, laxatives, chemotherapeutants, oral vaccines, hyperglycemic agents, systemic insecticides, expectorants and growth-promoting agents.

In the administration of many biologically active substances, such as anthelmintics and antibiotics, the novel coating compositions provide an additional function. Such substances may inhibit the normal function of the rumen microflora and will seriously affect the health of the animal. The protective coatings described and claimed herein will prevent the contact of the rumen microflora with said active components.

To be useful in the practice of this invention with ruminants, it is desirable that the protective coating be such that a maximum, for example 80 to 90 percent by weight of the original biologically active substance or agent passes through the rumen and at least 80 to 90 percent of the remaining agent after passing the rumen survives the gastric medium and passes into the intestine. It is most important that a substantial part of the biologically active agent becomes released in the intestinal fluid. Thus, in this specification "useful" is a relative term and means that less than a predetermined maximum of the biologically active substance is leached out of the composition by the medium to which it is subjected. The part of the biologically active substance which is leached by either the rumen fluid or gastric fluid is chemically changed, destroyed or otherwise rendered useless in performing its intended function. The desired optimum utility is accomplished by the composition where none of the biologically active substance is destroyed in either the rumen fluid or the gastric fluid so as to pass into the intestinal region the maximum quantity of the active agent.

The requisite delicate balance of solubilities is difficult to accomplish. However, the present applicants have discovered unexpectedly that aminopolyamide resins of certain structural characteristics provide the required effects in restraining solubility in areas where either the rumen microflora or the natural acidity of the gastric fluid would render useless the biologically active substances, but releasing the said substances in the intestinal tract, where the biologically active substances will be absorbed as part of the natural assimilation process.

The expression "aminopolyamide resin" identifies a genus of polyamide resins which contain a substantial quantity of unreacted amino groups. The resins used in accordance with the present invention are prepared by condensing polyamines, polycarboxylic acids, monocarboxylic acids, monoamines and aminoacids so selected and proportioned that the resins consist substantially entirely of amide groups,

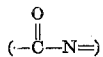

amino nitrogen atoms and hydrocarbon groups, the weight percentages of these three components in all instances totaling 100 percent. These resinous compositions to be useful in the practice of this invention will contain 83 to 87.5 weight percent hydrocarbon moieties, 1 to 4.2 weight percent amino nitrogen and the balance amide groups

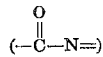

Figure 2:
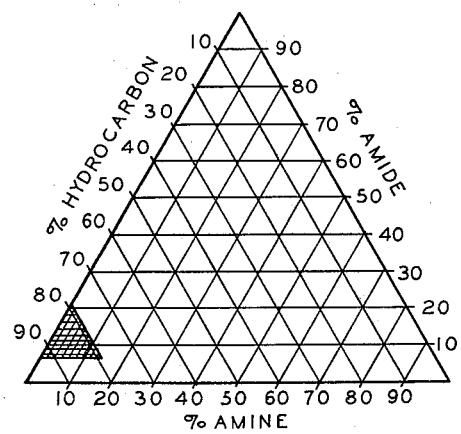

The compositions of the present resins are clearly set forth in the drawing, in which FIGURES 1 and 2 are ternary diagrams illustrating the weight ratio range of the resin components. The shaded portion of FIGURE 2 include the aminopolyamides useful in the practice of the invention. FIGURE 1 is an enlargement of a portion of the shaded area of FIGURE 2. The preferred aminopolyamides of the present invention have compositions within area ABCDE of FIGURE 1.

The described polyamide resins containing free amino radicals are condensation polymers prepared by the inter-reaction of polyamines and polycarboxylic acids, which condensation reaction may include as reactants mono-functional amine and carboxylic acid to provide chain end groups whereby the molecular weight and other properties can be controlled. Useful monofunctional amines include octadecyl amine, dodecyl ethyl amine, lauryl amine, benzyl amine, isooctyl amine, n-butyl amine and other alkyl amines of up to 22 carbon atoms, or mixtures thereof. Useful monocarboxylic acids include oleic acid, benzoic acid, abietic acid, pimaric acid, palmitic acid, hypogeic acid, caproic acid, butyric acid, behenic acid and other saturated or unsaturated acids of up to 22 carbon atoms or mixtures thereof. Since the preparation often involves heating at temperatures above the boiling points of some of the lower molecular weight monoamines and monocarboxylic acids, those of higher weights are usually more practicable. The useful acids are readily available as mixtures derived by saponification of animal and vegetable oils. The amines or mixtures of the amines can be obtained from the acids by amidation followed by hydrogenation.

The polymerizations are conducted to provide substantially complete reaction of the carboxyl groups with amino groups. Since all of the present resins contain unreacted amino groups in substantial proportions, it is apparent that essentially all carboxyl groups are converted to amide groups. Useful compounds can be prepared by condensing only diamines and dicarboxylic acids. With an excess of the diamine in order to have the required unreacted amino groups in the polymer, the reaction stops when all of the carboxyl groups are converted to amide groups. The use of a substantial excess of the diamine provides the desired number of unreacted amino groups, the diamine acting as the terminal group on the polymer chains. In preparing these polymers, diamines are reacted with dicarboxylic acids, such as succinic acid, sebacic acid, phthalic acid, tetrapropenyl succinic acid, azelaic acid, suberic acid, pimelic acid, adipic acid, brassic acid, roccellic acid, cyclohexane-1,4-dicarboxylic acid, oxy-bis-propionic acid, oxalic acid, benzene-1,4-bis-acetic acid, N,N-bis(carboxyethyl)methyl amine, octadecane-1,4-dicarboxylic acid, homophthalic acid, isophthalic acid and terephthalic acid.

In order to provide in the polymers a high weight percent of hydrocarbon moiety, the higher molecular weight dicarboxylic acids can be used. Useful very high molecular weight dicarboxylic acids can be prepared by polymerizing unsaturated carboxylic acids (such as linoleic acid) or mixtures thereof to form preferably dimeric or trimeric acids. Some of these polymeric acids are available commercially as "dimer acids" which is primarily the dimer of linoleic acid reputed to have the structure:

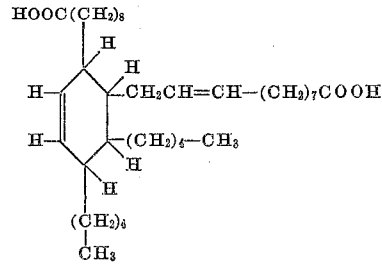

This dicarboxylic acid can be hydrogenated to prepare a corresponding saturated acid. Other suitable high molecular weight carboxylic acids are the rosin acids and especially the dimerized rosin acid, which is the dimer of abietic acid and therefore is a dicarboxylic acid.

Useful polyamines for the practice of the invention include:

diethylene triamine
triethylene tetramine
imino-bis-isopropylamine
N-methyl imino-bis-isopropylamine
tetraethylene pentamine
imino-bis-propylamine
N-octyl imino-bis-propylamine
N-octadecyl imino-bis-propylamine
ethylene diamine
1,4-butane diamine
hexamethylene diamine
oxy-bis-propylamine
thio-bis-propylamine
N-dodecylethylene diamine
N-octadecyl-1,3-propanediamine
bis-hexamethylene diamine
N,N'-bis-3-aminopropyl-1,4-xylylenediamine
2-methyl-4-aminomethyl-heptamethylenediamine
1,4-xylylene diamine
1,2-xylylene diamine
1,3-xylylenediamine
N,N-dimethyl-1,3-propanediamine
1,3-propylene diamine
tetraethylene diamine
N,N'-bis(3-aminopropyl)hexamethylene diamine
N-(3-aminopropyl)dimethylamine
2-methyl-4-aminomethyl heptamethylenediamine
N,N'-bis(3-aminopropyl)-1,4-xylene diamine
9(10)-aminomethyl stearyl amine
N,N'-bis(3-aminopropyl)stearylamine
4-amino-4-methylheptamethylene diamine
N-aminoethyl piperazine
1,2,3-tris(3-aminopropyloxy)propane Dimer diamines can be prepared by the amidation of the dimer acid and hydrogenation to the diamine:

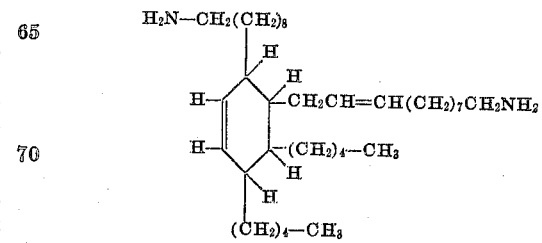

Higher molecular weight polyamines can be prepared by the cyanoethylation of the "dimer diamine" to form compounds of the structure:

H₂NCH₂CH₂CH₂NH-CH₂(CH₂)₈

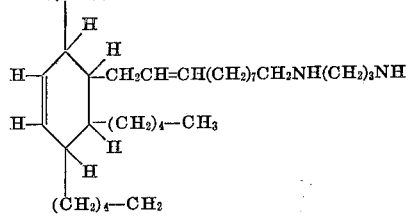

This compound is hereinafter identified by the term "dimer tetramine."

The amide nitrogen content of the polymer can be increased by using dicarboxylic acids which have been condensed with two moles of a diamine whereby a diamine with amide linkages is prepared. For simultaneously increasing both the amide and hydrocarbon moiety the dimer acids of linoleic acid may be condensed with two moles of a diamine. Useful high molecular amines with amide linkages can be prepared by reacting two moles of a simple diamine, for example ethylene diamine, with the dimer acid described above. This polymeric diamine will have the structure:

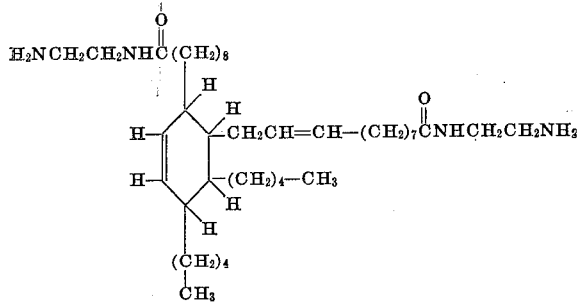

The amide moiety can be increased without increasing the amine content and with only slight increases of the hydrocarbon moiety of aminoacids in the polymerizing mixture. One mole of the aminoacid can be reacted with either available amine group and the product has the same amino function with higher amide and hydrocarbon.

The same polymers can be prepared from the acid chlorides of the dicarboxylic acids by reaction with the polyamines. In this instance, HCl is evolved instead of the water evolved by the several procedures above described. The same polymers can also be prepared by condensing polyamines with esters, particularly the methyl and ethyl esters of the dicarboxylic acids in which case alcohols are evolved during the reaction.

In the reactions of polyamines having more than two amino groups with dicarboxylic acids, dicarboxylic acid chlorides, or esters of dicarboxylic acids branched chain polymers are formed, but these are useful in the practice of the invention as long as the amine, amide and hydrocarbon moieties are within the prescribed limits. Similarly the diamine can be condensed with carboxylic acids, acid chlorides or esters thereof having more than two functions, such as butane tetracarboxylic acid, trimethyl trimelitate, aconitic acid, trimers of linoleic acid and the acid chlorides of citric acid, to provde branched chain polymers which are useful in the practice of this invention if the component moieties are as above described.

The reactants can contain hetero atoms such as oxygen and sulfur and these are considered as part of the residue which is usually hydrocarbon. Thus, useful dicarboxylic acids include, for example oxy-bis-propionic acid and thio-bis-oleic acid. Similarly, the hetero atom can be in the hydrocarbon moiety of the diamine, for example as in 3-oxa-pentylene-1,5-diamine, and bis(amino lauryl) sulfide.

In these manners the polyamide can be tailored to have dispersibility properties required for the coating compositions of the present invention. By proportioning the reactants to provide the requisite proportions of amino nitrogen, amide $$(-\overset{O}{\underset{\|}{C}}-N=)$$

and hydrocarbon moieties and heating to effect a polymerization, a resin can be made to resist the action of the rumen microflora, and the gastric acidity but to still be dispersible in the intestinal fluids. In the conduct of the polymerization all of the reagents can be charged initially or be added successively. If the reagents are charged in the amounts required to provide the required content of the three moieties, the polymerization will proceed by heating to a fluid state. In many instances, the polymers solidify on cooling, but if they are tacky or viscous liquids, these seemingly undesirable properties can be obviated by the formulation procedure.

THE PREPARATION OF RESINS

A flask fitted with a thermometer, a dropping funnel, stirrer and a 10-inch Vigreux column topped with a distilling head was charged with 58.4 g. (0.100 mole) of dimer acid (see Note No. 1 to Table 1) containing a trace of antifoaming agent. The pot contents were heated to approximately 100° C. and flushed three times with nitrogen with intervening evacuations with a water aspirator. Methylimino-bis-propyl amine (0.100 mole) was added as rapidly as possible to the well-stirred reaction mixture. The temperature rose to 135° C. and was kept at 135–140° C. for one hour. The reaction temperature was then raised to 200° C. and held there for five hours with the pressure held at 35 mm. vacuum after the first hour. The aqueous distillate (4.0 ml.) which was collected in the receiver and an ice trap required 6.0 ml. of 0.5 N hydrochloric acid to neutralize. The product, after cooling to room temperature, was a stiff, rubbery resin with an amine number of 87.0 and an acid number of 3.5.

Numerous other aminopolyamide resins were prepared in general accordance with the above procedure. The following table shows various combinations of reactants and proportions thereof used to provide polymers having the necessary combination of amino nitrogen, amide and hydrocarbon moieties. The table also illustrates the preparation of some compounds with contents of amino nitrogen, hydrocarbon and amide outside of the limits described by weight percent are shown on the ternary diagram (FIGURE 2) of the drawing. In the table, the proportions of the reactants are expressed as molar equivalents.

TABLE 1
AMINE-CONTAINING POLYAMIDE RESINS

| Resin No. | Reactants | Equivalents |
|---|---|---|
| 1 | Dimer acid (1) | 2.020 |
|   | Diethylene triamine | 3.135 |
|   | Oleic acid | 0.150 |
| 2 | Dimer acid (2) | 1.220 |
|   | Diethylene triamine | 2.085 |
|   | Oleic acid | 0.230 |
| 3 | Dimer acid (2) | 1.000 |
|   | Diethylene triamine | 1.500 |
| 4 | Dimer acid (2) | 1.000 |
|   | Diethylene triamine | 1.290 |
|   | Ethylene diamine | 0.290 |
|   | Oleic acid | 0.150 |
| 5 | Dimer acid (2) | 1.000 |
|   | Diethylene triamine | 0.435 |
|   | Ethylene diamine | 0.860 |
|   | Oleic acid | 0.150 |
| 6 | Dimer acid (1) | 1.000 |
|   | Diethylene triamine | 1.500 |
|   | Oleic acid | 0.003 |
| 7 | Isophthalic acid | 0.500 |
|   | Dimer tetramine (7) | 2.000 |
|   | Oleic acid | 0.050 |
| 8 | Dimer acid (2) | 0.550 |
|   | Diethylene triamine | 0.750 |
|   | Stearyl amine | 0.100 |
| 9 | Dimer acid (2) | 0.155 |
|   | Methylimino-bis-propyl amine | 0.255 |
|   | Oleic acid | 0.022 |
| 10 | Azelaic acid | 0.200 |
|   | Dimer tetramine (7) | 0.480 |
|   | Oleic acid | 0.040 |

TABLE 1—Continued
AMINE-CONTAINING POLYAMIDE RESINS

| Resin No. | Reactants | Equivalents |
|---|---|---|
| 11 | Dimer acid (1) | 0.200 |
|  | Methylimino-bis-propyl amine | 0.300 |
| 12 | Dimer acid (2) | 0.258 |
|  | Imino-bis-propyl amine | 0.468 |
|  | Oleic acid | 0.037 |
| 13 | Dimer acid (2) | 0.500 |
|  | Ethylene diamine | 0.290 |
|  | Diethylene triamine | 0.335 |
|  | Oleic acid | 0.075 |
| 14 | Dimer acid (1) | 0.500 |
|  | Diethylene triamine | 0.570 |
|  | Triethylene tetramine | 0.572 |
|  | Oleic acid | 0.100 |
| 15 | Dimer acid (1) | 0.500 |
|  | Diethylene triamine | 0.735 |
|  | Triethylene tetramine | 0.286 |
|  | Oleic acid | 0.100 |
| 16 | Dimer acid (1) | 0.400 |
|  | Diethylene triamine | 0.600 |
|  | Dimer tetramine (7) | 0.200 |
|  | Oleic acid | 0.100 |
| 17 | Dimer acid (1) | 0.400 |
|  | Azelaic acid | 0.100 |
|  | Diethylene triamine | 0.810 |
|  | Hexamethylene diamine | 0.060 |
|  | Oleic acid | 0.100 |
| 18 | Dimer acid (2) | 0.201 |
|  | Dimerized rosin (5) | 0.159 |
|  | Diethylene triamine | 0.540 |
| 19 | Dimer acid (2) | 0.380 |
|  | Dimerized rosin (5) | 0.106 |
|  | Diethylene triamine | 0.771 |
|  | Oleic acid | 0.028 |
| 20 | Dimer acid (1) | 0.150 |
|  | Diethylene triamine | 0.150 |
|  | Dimer tetramine (7) | 0.200 |
|  | Oleic acid | 0.050 |
| 21 | Dimer acid (1) | 0.1333 |
|  | Azelaic acid | 0.0667 |
|  | Diethylene triamine | 0.070 |
|  | Dimer tetramine (7) | 0.440 |
| 22 | Dimer acid (1) | 0.253 |
|  | Azelaic acid | 0.080 |
|  | Ethylene diamine | 0.213 |
|  | Diethylene triamine | 0.281 |
|  | Pelargonic acid | 0.0667 |
| 23 | Trimer acid (4) | 0.300 |
|  | Ethylene diamine | 0.600 |
| 24 | Dimer acid (2) | 0.271 |
|  | Dimerized rosin (5) | 0.106 |
|  | Diethylene triamine | 0.567 |
| 25 | Dimer acid (2) | 0.201 |
|  | Dimerized rosin (5) | 0.159 |
|  | Diethylene triamine | 0.596 |
| 26 | Isophthalic acid | 0.267 |
|  | Ethylene diamine | 0.100 |
|  | Dimer tetramine (7) | 0.233 |
|  | Benzoic acid | 0.067 |
| 27 | Dimer acid (1) | 0.200 |
|  | Triethylene tetramine | 0.399 |
|  | Dimer tetramine (7) | 0.227 |
|  | Oleic acid | 0.067 |
| 28 | Dimer acid (1) | 0.400 |
|  | Azelaic acid | 0.100 |
|  | Diethylene triamine | 0.600 |
|  | Hexamethylene diamine | 0.200 |
|  | Pelargonic acid | 0.040 |
|  | Oleic acid | 0.020 |
| 29 | Dimer acid (1) | 0.452 |
|  | Azelaic acid | 0.080 |
|  | Diethylene triamine | 0.843 |
|  | Hexamethylene diamine | 0.108 |
| 30 | Dimer acid (1) | 0.2667 |
|  | Triethylene tetramine | 0.200 |
|  | Tetraethylene pentamine | 0.325 |
|  | Dimer tetramine (7) | 0.328 |
|  | Oleic acid | 0.0333 |
| 31 | Dimer acid (1) | 0.258 |
|  | Diethylene triamine | 0.117 |
|  | Triethylene tetramine | 0.488 |
|  | Dimer tetramine (7) | 0.104 |
|  | Oleic acid | 0.0333 |
| 32 | Dimer acid (1) | 0.350 |
|  | Azelaic acid | 0.050 |
|  | Diethylene triamine | 0.378 |
|  | Triethylene tetramine | 0.448 |
|  | Dimer tetramine (7) | 0.056 |
| 33 | Dimer acid (3) | 0.400 |
|  | Diethylene triamine | 0.600 |
|  | Duomeen T (8) | 0.080 |
| 34 | Dimer acid (3) | 0.160 |
|  | Azelaic acid | 0.160 |
|  | Duomeen CS (9) | 0.800 |
|  | Pelargonic acid | 0.040 |
| 35 | Dimer acid (3) | 0.400 |
|  | Triethylene tetramine | 0.936 |
|  | Dimer diamine (6) | 0.0328 |
|  | Oleic acid | 0.050 |
| 36 | Dimer acid (3) | 0.320 |
|  | Diethylene triamine | 0.090 |
|  | Tetraethylene pentamine | 0.5485 |
|  | Duomeen CS (9) | 0.300 |
|  | Oleic acid | 0.040 |
| 37 | Dimer acid (3) | 0.1616 |
|  | Azelaic acid | 0.212 |
|  | Triethylene tetramine | 0.3468 |
|  | Duomeen CS (9) | 0.532 |
|  | Oleic acid | 0.0317 |
| 38 | Dimer acid (3) | 0.340 |
|  | Azelaic acid | 0.060 |
|  | Diethylene triamine | 0.600 |
|  | Tetraethylene pentamine | 0.1665 |
|  | Oleic acid | 0.030 |
| 39 | Dimer acid (3) | 0.440 |
|  | Azelaic acid | 0.040 |
|  | Diethylene triamine | 0.840 |
| 40 | Dimer acid (3) | 0.343 |
|  | Azelaic acid | 0.1234 |
|  | Diethylene triamine | 0.798 |
|  | Oleic acid | 0.0667 |
| 41 | Dimer acid (1) | 0.2666 |
|  | Diethylene triamine | 0.180 |
|  | Triethylene tetramine | 0.416 |
|  | Dimer tetramine (7) | 0.1066 |
|  | Oleic acid | 0.0667 |
| 42(**) | Oxalyl chloride | 0.466 |
|  | Dimer diamine (6) | 0.400 |
|  | Tetraethylene pentamine | 0.335 |
| 43(**) | $C_{20}$ dicarbonyl chloride (11) | 0.600 |
|  | N,N-bis-3-aminopropyl dodecylamine | 1.050 |
|  | Palmitoyl chloride | 0.100 |
| 44 | Hydrogenated dimer acid (10) | 0.400 |
|  | Cyclohexane-1,4-dicarboxylic acid | 0.200 |
|  | 2-methyl-4-aminomethyl-heptamethylene diamine (12) | 1.050 |
|  | Abietic acid | 0.100 |
| 45 | Dimer acid | 0.400 |
|  | Thio-bis-propionic acid | 0.200 |
|  | Bis-hexamethylene triamine | 0.750 |
|  | 1,4-bis-aminomethylbenzene | 0.100 |
|  | m-Toluic acid | 0.100 |
| 46 | Oxy-bis-propionic acid | 0.050 |
|  | Dimer diamine (6) | 0.500 |
|  | N,N-bis (carbomethoxyethyl) methyl amine. | *0.500 |
|  | Dodecyl ethyl amine | 0.100 |
| 47 | Methyl carbomethoxyethyl octadecyl amine. | *0.100 |
|  | N,N'-bis-3-aminopropyl-1,4-xylylene diamine. | 1.000 |
|  | Dimer acid (3) | 0.400 |

NOTES TO TABLE 1

(1) Commercial polymerized unsaturated fatty acids consisting primarily of linoleic acid and containing 95% dimers, 4% trimers and 1% monomers; average neutral equivalent of 292.

(2) Commercial polymerized unsaturated fatty acids consisting primarily of linoleic acid and containing 75% dimers, 22% trimers and 3% monomers; average neutral equivalent of 295.

(3) Composition described in Note 1 except 2.9% oleic acid added.

(4) A commercial trimer of $C_{18}$ unsaturated fatty acids.

(5) A commercial polymerized rosin containing 40% dimerized rosin acid and 20% monomeric rosin acids.

(6) The diamine prepared from composition of Note 1; equivalent weight of 290.

(7) The tetramine prepared by the hydrogenation of the bis-cyanoethylated dimer diamine; equivalent weight of 180.

(8) N-(α-aminopropyl) tallow amine, neutral equivalent 173.

(9) The polyamine of the structure:

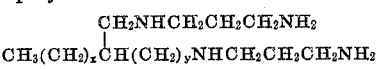

where $x+y=16$

(10) The composition prepared by the double bond hydrogenation of the composition of Note 1.

(11) Acid chloride prepared from a $C_{20}$ dicarboxylic acid of which a major constituent is a linear α-ω-dicarboxylic acid.

(12) Obtained by the hydrogenation of the acrylonitrile trimer.

(*) As a dicarboxylic acid.

(**) Prepared using an interfacial polymerization technique.

The above polyamides were tested to determine their dispersibility in intestinal, gastric and rumen fluids. Samples of the polyamides were immersed in the fluids and the loss of weight of the resins was measured. The following table shows the observed dispersibility of the polymers after 24 hours in the rumen fluids, one hour in the gastric fluids and 16 hours in the intestinal fluids. These periods of time simulate the retention of the ingested polymers in the digestive systems of ruminants. In the table, the letter D is used to indicate dispersibility and the letter N to indicate non-dispersibility of the resins in the body fluids. The dispersibility or non-dispersibility corresponds to the loss in weight of the resins resulting from their dispersion when immersed in the fluids for the above-specified periods of time. With regard to the rumen and gastric fluids, D designates a resin weight loss of at least 10%, and N designates a weight loss of less than 10%. Likewise, with regard to the intestinal fluid, D designates at least a 50% loss in weight of the immersed resins and N designates a lesser weight loss.

The criticality of the resinous compositions is readily appreciated by reference to the table. It will be noted that Resin Nos. 5, 10, 13, 20, 21, 22, 28, 29, 30, 31, 32, 34, 35, 36, 37, 38 and 40, having compositions outside the above-described limits are either non-dispersible (N) in the intestinal fluid, or dispersible (D) in the gastric fluid. Thus these resins could not be used in conveying biologically active substances through the rumen and gastric fluids and releasing them for assimilation in the intestine. By contrast, all of the resins of the invention are dispersible (D) in intestinal fluid and non-dispersible (N) in the rumen and gastric fluids.

TABLE 2.—COMPOSITION AND DISPERSIBILITY OF AMINO-POLYAMIDES

| Resin No | Composition, percent | | | Dispersibility | | |
|---|---|---|---|---|---|---|
| | H.C. | Amide | Amine | Intestinal | Gastric | Rumen |
| 1 | 84.95 | 13.15 | 1.90 | D | N | N |
| 2 | 84.67 | 13.16 | 2.17 | D | N | N |
| 3 | 84.91 | 12.97 | 2.12 | D | N | N |
| 4 | 85.08 | 13.30 | 1.62 | D | N | N |
| 5 | 85.61 | 13.83 | 0.56 | N | N | N |
| 6 | 84.73 | 13.15 | 2.12 | D | N | N |
| 7 | 86.43 | 10.72 | 2.85 | D | N | N |
| 8 | 86.60 | 11.20 | 2.20 | D | N | N |
| 9 | 85.73 | 12.48 | 1.79 | D | N | N |
| 10 | 87.54 | 9.40 | 3.06 | N | N | N |
| 11 | 85.59 | 12.42 | 2.20 | D | N | N |
| 12 | 85.14 | 12.48 | 2.38 | D | N | N |
| 13 | 85.43 | 13.58 | 0.99 | N | N | N |
| 14 | 83.63 | 12.66 | 3.71 | D | N | N |
| 15 | 84.10 | 12.94 | 2.96 | D | N | N |
| 16 | 86.69 | 11.12 | 2.19 | D | N | N |
| 17 | 83.11 | 14.73 | 2.16 | D | N | N |
| 18 | 87.01 | 11.08 | 1.91 | D | N | N |
| 19 | 85.50 | 12.47 | 2.03 | D | N | N |
| 20 | 88.68 | 9.10 | 2.22 | N | N | N |
| 21 | 89.34 | 7.09 | 3.57 | N | N | N |
| 22 | 81.65 | 17.05 | 1.30 | N | N | N |
| 23 | 84.35 | 13.02 | 2.65 | D | N | N |
| 24 | 85.85 | 12.22 | 1.93 | D | N | N |
| 25 | 86.08 | 11.56 | 2.36 | D | N | N |
| 26 | 83.85 | 13.16 | 2.99 | D | N | N |
| 27 | 86.97 | 9.07 | 3.96 | D | N | N |
| 28 | 82.70 | 15.60 | 1.70 | N | D | N |
| 29 | 82.48 | 13.95 | 3.57 | D | D | N |
| 30 | 87.11 | 8.06 | 4.83 | N | N | N |
| 31 | 84.73 | 10.40 | 4.87 | D | D | N |
| 32 | 82.75 | 12.40 | 4.85 | D | D | N |
| 33 | 85.32 | 11.95 | 2.73 | D | N | N |
| 34 | 85.73 | 9.90 | 4.37 | N | D | N |
| 35 | 84.01 | 11.60 | 4.39 | D | D | N |
| 36 | 84.70 | 10.40 | 4.90 | N | D | N |
| 37 | 82.57 | 12.40 | 4.73 | D | D | N |
| 38 | 82.50 | 13.95 | 3.55 | D | D | N |
| 39 | 83.09 | 13.60 | 3.31 | D | D | N |
| 40 | 82.10 | 15.40 | 2.50 | D | D | N |
| 41 | 85.07 | 10.98 | 3.95 | D | N | N |
| 42 | 83.35 | 14.0 | 2.65 | D | N | N |
| 43 | 84.08 | 13.7 | 2.22 | D | N | N |
| 44 | 83.43 | 14.25 | 2.32 | D | N | N |
| 45 | 83.54 | 14.75 | 1.71 | D | N | N |
| 46 | 84.67 | 13.50 | 1.83 | D | N | N |
| 47 | 85.97 | 10.50 | 3.53 | D | N | N |

PREPARATION OF BIOLOGICALLY ACTIVE COMPOSITIONS

Example 1

Eighty grams of Resin No. 3, described above, was blended with 320 grams of procaine penicillin G on a two roll mill at 140° F. The resulting product was sheeted off at a thickness of ¼" and cut into strips of about ½" wide. The strips were fed into an extrusion mill with a circular die. The product was drawn down to a diameter of 1.5 to 2 mm. After cooling, it was cut into pieces 1.5 to 2 mm. long using a rotary chopper.

Example 2

A 40 gram sample of the calcium salt of the hydroxy analogue of methionine (with hydroxyl radical replacing the amino group) was blended with 10 grams of Resin No. 6. The resin was converted into particles of 1.5 to 2.0 mm. in diameter by 1.5 to 2.0 mm. in length for use as an animal feed supplement.

Example 3

Five separate batches of 800 g. of procaine penicillin G with 200 grams of Resin No. 6 were mixed on a roll mill at 140 to 150° F. The product was sheeted off at ¼ inch thickness and cut into 2–3 inch squares. The plastic product was cooled on solid carbon dioxide and ground. The larger particles were reground and the entire product had the following size distribution:

730 g. retained on 12 mesh USS Screen
2450 g. 12 to 24 mesh
1966 g. fines passing the 24 mesh screen The 12 to 24 mesh product was of size suitable for addition to feed compositions.

Example 4

The quaternary ammonium salt of oxytetracycline (5.55 grams) and 1.78 grams of Resin No. 3 were blended on a warm roll mill. The cold, brittle product was ground and screened as follows:

|  | Grams |
|---|---|
| (A) Larger than 16 mesh | 0.6 |
| (B) 16 to 20 | 2.05 |
| (C) 20 to 35 | 1.85 |
| (D) 35 to 45 | 0.45 |
| (E) Smaller than 45 | 1.05 |

The B and C sizes were test-suited for feed supplements.

Example 5

A solution of 1.5 grams of Resin No. 3 in 6.5 ml. of tetrahydrofuran was mixed with 28.5 g. soybean meal. The solvent tetrahydrofuran was removed by stirring the mixture while passing a stream of air through the mix. The resulting product was a mixture of granules or aggregates with a uniformly dispersed matrix of resin.

Example 6

Resin No. 6 was milled with four parts by weight of an enzyme mixture of amylase, protease and hemicellulase on a roll mill and sheeted out at approximately 2 mm. and cut into cubes. The resulting product was mixed with a prepared cattle feed including cellulosic roughage. A uniform enzyme enriched diet was thereby formed.

Example 7

Useful coated enzymes were prepared by mixing a pure amylase preparation with an inert filler and thereafter stirring the mixture into a melt of Resin No. 3. The following useful biologically active compositions were thereby prepared:

| Carrier | Resin, g. | Enzyme, g. | Unit enzyme per mg. of prep. |
|---|---|---|---|
| Calcium meta silicate | 4.0 | 225 | 7.2 |
| Talc | 7.0 | 300 | 6.4 |
| Clay | 7.0 | 300 | 6.4 |
| Magnesium oxide | 7.0 | 300 | 6.4 |

Example 8

Ten kg. of resin coated soybean protein was prepared in several batches. In each batch 1250 g. of commercial soybean meal was treated with 669 gms. of Resin No. 6 dissolved in 375 ml. methylene chloride. The solvent was evaporated by air drying to form a protective layer of resin on the protein particles. The addition of this resinous composition to cattle feed provided a protein enriched diet.

Example 9

A mixture of 160 g. of procaine penicillin G and 40 g. of Resin No. 3 was milled at 140° F. and sheeted in ⅛" sheet. It was cut on a mill into ¼" strips which were allowed to cool to form a brittle composition. They were ground on a Wiley mill and the resulting particles sieved to produce 74.5 g. of 16 to 20 mesh particles. The 122 g. of fines were remilled and further ground to produce an additional quantity of 16 to 20 mesh particles.

The highly useful compositions of the present invention which involve the combination of an active ingredient and a protective aminopolyamide resin may be fabricated by means other than already disclosed. Granulations of the active constituents, with or without added formulation ingredients, can be prepared and coated with aminopolyamide compositions by conventional pan coating techniques or by use of the air-suspension techniques. The coated products of this invention may also be obtained by use of electrostatic encapsulation, centrifugal encapsulation or spray-drying techniques. The coated forms may include powders, granules, capsules, droplets, pills, tablets, pellets or other pilular forms. The term "coating" is used herein in its broadest sense and includes individual coatings for discrete particles as well as protective carriers and binders having active components distributed therethrough.

The procedures and compositions above described may involve considerable variation in the content of biologically active agent and protective carrier. Where relatively large discrete particles or tablets of the biologically active components are to be protected, the protective coating may be as little as two parts by weight of resin with 98 parts of the active component. Heavier coatings are frequently required, for example up to 25 parts by weight of the resin with 75 parts of the active agents. Greater proportions of resins also may be used, especially when the particles of the biologically active component are small discrete particles or semi-liquids. In the latter instance, the resin may be present to the extent of 95 parts by weight to 5 parts of the active component, the resin forming a matrix in which particles or globules of the active component are embedded or suspended.

The biologically active component can be used alone or in combination with other described agents. Furthermore, a combination of resinous compounds, in some instances, provides beneficial effects not accomplished by an individual resin. In addition, the resin and biologically active agent can be incorporated with other components including, for example, inert fillers, such as clays, silica, vermiculite and bentonite; surface active agents; plasticizers, dispersing agents, antioxidants, binders, adhesives and diluents.

Example 10

To demonstrate the resistance of the protective coatings on procaine penicillin G (Example 9) to the effects of rumen fluids, gastric fluids and intestinal fluids, a series of nylon bags containing coated particles were suspended in the fluids at 39° C.

To simulate the passage of the particles through a ruminant animal, the bags were first incubated for 24 hours in the rumen fluid, maintained in the gastric fluid for one hour, and finally incubated in the intestinal fluid for periods of 1 to 6 hours. The amount of penicillin released to the incubating fluids was measured and is set forth in the following table.

| Preparation No. | Resin No. | Rumen fluid, percent penicillin recovered, 24 hrs. | Intestinal fluid, percent penicillin recovered | |
|---|---|---|---|---|
| | | | 1 hr. | 6 hrs. |
| I | 3 | 8.6 | 11.9 | 50.2 |
| II | 3 | 15.8 | 24.5 | 38.8 |
| III | 6 | 14.0 | 22.3 | 43.7 |
| IV | 6 | 13.2 | 16.6 | 46.7 |
| V | 19 | 7.2 | 23.4 | 50.8 |
| VI | 24 | 9.9 | 11.2 | 14.8 |

When procaine penicillin G without a protective carrier was incubated in rumen fluid for 24 hours, the antibiotic properties were entirely destroyed.

These tests show that relatively small amounts of the procaine penicillin G are leached from the coated compositions in a normal rumen composition and 24 hours retention time. Subsequent action of the intestinal fluid extracts substantial quantities of the procaine penicillin in one to six hours. Other biologically active feed components, which are destroyed or otherwise lose their efficacy in the presence of the rumen microflora, may be stabilized or protected by coating them with the described aminopolyamide resins prior to incorporating them in feed compositions.

Useful feeds for ruminant animals may include many of a wide variety of nutrient compositions which are not affected deleteriously by the action of the rumen. Many of these feed components are benefited by the rumen microflora and for some the reactions within the rumen are essential for adequate digestion and assimilation.

A conventional component in ruminant feeds is the cellulosic roughage component. By the expression "cellulosic roughage" it is intended to refer to any nutrient component which contains at least 5% fiber. The fiber is principally cellulose which may also contain lignin chemically bound thereto. Typical fiber containing feeds include hay, straw, cottonseed hulls, cotton mill wastes, beet pulp, silage, ground corn cobs, corn stalks, oats, barley, cereal brans, and cereal middlings. One or more of these cellulosic roughage components are present in balanced ruminant feeds and at least 2% by weight is included and as much as 60% or more may be used. However, in some areas cattle are fed with diets consisting of high proportions of barley and/or oats, or substantially entirely of these high fiber cereals.

The ruminant feeds may contain natural oils including animal fats, such as beef tallow, mutton tallow; fish oils including eel, herring, menhaden, tuna and salmon oil, and whale oil. The vegetable oils are usually of higher unsaturated acid content and are therefore generally liquid, for example, soybean oil, sunflower oil, olive oil, safflower oil, corn oil, peanut oil, cottonseed oil, rice oil, millet oil, wheat germ oil and palm oil. Any of these may be included in the feed.

An optional component of the animal feeds is a non-toxic antioxidant. These substances tend to preserve vitamins and the unsaturation in oils by preventing the oxidation which normally occurs during the preparation, storage and use of the animal feeds. In the feed composition the use of from 0.001 to 0.1% by weight of the non-toxic antioxidant has been found to enable the stabilization of the unsaturation and the preservation of the nutrient values of the feed. Preferred usage involves the addition of from 0.005 to 0.05% of the non-toxic antioxidants.

Suitable antioxidants which may be used in the practice of this invention are the pyrogallol derivatives, for example, gallic acid and the esters thereof, particularly propyl, octyl, lauryl and octadecyl esters; the catechol derivatives, such as chlorogenic, caffeic, nordihydroquaiaretic acids and alkyl esters thereof; the hindered phenols such as 2-butyl-4-methoxy-phenol and 2,6-di-(t-butyl)-4-methyl phenol; the flavonoids, such as 3-hydroxyflavone; sulfur compounds, such as dilauryl thiodipropionate; the aromatic amines, such as N,N'-diphenyl-p-phenylenediamine and N-sec-butyl-4-n-hexyloxyaniline, the sulfhydryls and the quinolines. Of particular importance in the practice of this invention is the use of the dihydroquinoline type of antioxidant and particularly 6-ethoxy-2,2,4-trimethyl-1,2-dihydroquinoline.

Complete balanced feeds may also contain in addition to cellulosic roughage, other components, for example, minerals, such as bone meal, salt and the various trace minerals including salts of zinc, copper, manganese, magnesium, cobalt, iodine and iron. These conventional feed components are usually not decomposed by the action of the rumen microflora and accordingly do not require the protective coatings of the aminopolyamides. There are some other components of feeds which are not seriously affected by the rumen microflora and do not have a deleterious effect on these organisms, and these also may be used in ruminant feed without the protective coating, for example, sulfamethazine.

Typical examples of the ruminant feeds which possess the useful properties herein described are as follows:

Example 11

Procaine penicillin G was enclosed in aminopolyamide by the procedure of Example 9 and was used as a supplement to feeds of the following composition:

|  | Wt. percent |
|---|---|
| Ground corn | 41.66 |
| Soybean meal (50% protein) | 5.00 |
| Deflorinated phosphate rack (18% P) | 0.88 |
| Trace minerals | 0.45 |
| Molasses | 8.00 |
| Chopped alfalfa (14% protein) | 44.00 |
| Vitamins A and D | 0.01 |

Whethers (50 to 55 lbs. each) were fed the above described supplemented feed. Identical experimental feeding studies were conducted using procaine penicillin G without protective coating of polyamide resin. Control experiments with feeds not supplemented with procaine penicillin G were also performed.

Weight gains and feed efficiencies were observed in these experimental feeding studies using different levels of the procaine penicillin supplementation.

The following observations were made:

| Treatment | Gm./ton | Average gain, kg. | Feed efficiency |
|---|---|---|---|
| Control | | 5.39 | 5.03 |
| Unprotected PPG | 20 | 5.1 | 5.13 |
| Do | 40 | 4.95 | 5.21 |
| Coated PPG | 20 | 5.54 | 4.78 |
| Do | 40 | 5.91 | 4.42 |

Example 12

Using the rations and coated procaine penicillin G described in Example 11, feed studies were conducted to determine the additional effect of sulfamethazine in ruminant feeds. Studies were also made with feeds both with and without supplementation by the coated procaine penicillin G. Other studies were made to determine the effect of sulfamathazine alone and in combination with the coated procaine penicillin G (PPG).

The following observations were made:

| Supplement | Level, Gm./ton | Average daily gain, lbs. | Feed efficiency |
|---|---|---|---|
| None | | 0.461 | 6.89 |
| Coated PPG | 40 | 0.510 | 6.25 |
| Mixture of coated PPG (40) and sulfamethazine (100) | 140 | 0.710 | 5.33 |
| Sulfamethazine alone | 100 | 0.603 | 5.65 |

The above experiments demonstrate that the uncoated biologically active components may under some circumstances have some utility without coatings, but optimum performance for the intended purpose will be obtained with the practice of this invention by the use of the aminopolyamide resin protective barrier.

Although the uses of the novel feeds and feed components are described with respect to specific modifications it is not intended that the details of these are limitations on the scope of the invention.

The embodiments of the invention in which an exclusive property or privilege is claimed are defined as follows:

1. A composition comprising a biologically active substance and an aminopolyamide resin containing from 1 to 4.2 weight percent of amino nitrogen, from 83 to 87.5 weight percent of hydrocarbon and from 8.3 to 16 weight percent of amide

said biologically active substance being sufficiently enclosed in said resin to be substantially non-dispersible in gastric and rumen fluids while being substantially dispersible in intestinal fluids.

2. A composition in accordance with claim 1 wherein said biologically active substance is enclosed in said aminopolyamide resin which is converted to a particle size from about 1.5 to 2.0 mm.

3. A composition in accordance with claim 1 wherein the biologically active substance is normally subject to decomposition in the presence of rumen microflora.

4. A composition comprising a biologically active substance and an aminopolyamide resin having a composition within area A B C D E of FIGURE 1, said biologically active substance being sufficiently enclosed in said resin to be substantially non-dispersible in gastric and rumen fluids while being substantially dispersible in intestinal fluids.

5. A composition in accordance with claim 4 wherein said biologically active substance is enclosed in said aminopolyamide resin.

6. A composition in accordance with claim 4 wherein the composition contains from about 2 to about 95 percent by weight of said aminopolyamide resin.

7. A composition in accordance with claim 1 wherein the biologically active substance is selected from the group consisting of aminoacids, antibiotics, sedatives, antipyretics, hormones, anthelmintics, enzymes, antipasmodics, hematics, laxatives, expectorants, proteins, and growth promoting agents.

8. A composition in accordance with claim 4 wherein the biologically active agent is selected from the group consisting of aminoacids, antibiotics, sedatives, antipyretics, hormones, anthelmintics, enzymes, antipasmodics, hematics, laxatives, expectorants, proteins and growth-promoting agents.

9. A composition in accordance with claim 4 wherein the biologically active substance is procaine penicillin G.

10. A composition in accordance with claim 4 wherein the biologically active agent is soybean meal.

11. A composition in accordance with claim 4 wherein the biologically active substance is a mixture of amylase, protease and hemicellulase.

12. A ruminant feed composition comprising from about 2 to about 60 percent by weight based on the total feed of a cellulosic roughage component and a biologically active substance sufficiently enclosed in an aminopolyamide resin to be substantially non-dispersible in gastric and rumen fluids while being substantially dispersible in intestinal fluids, said resin containing from 1.0 to 4.2 weight percent of amino nitrogen, from 83 to 87.5 weight percent of hydrocarbon and from 8.3 to 16 weight percent of amide

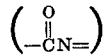

13. A ruminant feed composition comprising from about 2 to about 60 percent by weight based on the total feed of a cellulosic roughage component and a biologically active substance sufficiently enclosed in an aminopolyamide resin to be substantially non-dispersible in gastric and rumen fluids while being substantially dispersible in intestinal fluids, said resin having a composition within the area A B C D E of FIGURE 1.

14. A composition in accordance with claim 12 wherein the biologically active substance is normally unstable in the presence of rumen microflora.

15. A composition in accordance with claim 13 wherein the biologically active substance is normally unstable in the presence of rumen microflora.

16. A composition in accordance with claim 13 wherein the biologically active substance is enclosed in said aminopolyamide resin.

References Cited

UNITED STATES PATENTS

| | | | |
|---|---|---|---|
| 2,808,332 | 10/1957 | Anderson et al. | 99—6 XR |
| 3,231,545 | 1/1966 | Vertnik et al. | 260—78 |
| 3,242,141 | 3/1966 | Vertnik et al. | 260—78 |
| 3,330,729 | 7/1967 | Johnson | 167—82.9 |

A. LOUIS MONACELL, Primary Examiner

N. ROSKIN, Assistant Examiner

U.S. Cl. X.R.

99—2